United States Patent [19]
Takiguchi et al.

[11] Patent Number: 5,496,497
[45] Date of Patent: Mar. 5, 1996

[54] LIQUID CRYSTAL PREPOLYMER COMPOSITION AND LIQUID CRYSTAL DISPLAY DEVICE USING THE SAME

[75] Inventors: Yasuyuki Takiguchi, Kawasaki; Akihiko Kanemoto, Yokohama; Yumi Matsuki, Yamato, all of Japan

[73] Assignee: Ricoh Company, Ltd., Tokyo, Japan

[21] Appl. No.: 220,699

[22] Filed: Mar. 31, 1994

[30] Foreign Application Priority Data

Mar. 31, 1993 [JP] Japan .................................... 5-097182
Nov. 4, 1993 [JP] Japan .................................... 5-298888

[51] Int. Cl.$^6$ .............................. C09K 19/52; G02F 1/13
[52] U.S. Cl. ....................................... 252/299.01; 359/103
[58] Field of Search ........................ 252/299.01; 359/51, 359/52, 103

[56] References Cited

U.S. PATENT DOCUMENTS 5,204,763  4/1993  Hitman ...................................... 359/51
5,268,783  12/1993  Yoshinaga et al. ..................... 359/103
5,323,251  6/1994  Coates et al. ............................. 359/51
5,356,557  10/1994  Jubb et al. .......................... 252/299.01

*Primary Examiner*—Shean C. Wu
*Attorney, Agent, or Firm*—Oblon, Spivak, McClelland, Maier & Neustadt

[57] ABSTRACT

A liquid crystal/prepolymer composition which is composed of a liquid crystal component, a prepolymer composition and a polymerization initiator, the liquid crystal/prepolymer composition, when polymerized, being capable of causing phase separation into the liquid crystal and a polymer, the prepolymer composition containing a monofunctional acrylate component having one double bond, with an HLB value of 2.5 to 7.0; and a bifunctional acrylate component having two double bonds, with an HLB value of 3.5 to 11. In addition, there is also disclosed a liquid crystal display device composed of a pair of support materials and a liquid crystal/polymer composition held between the support materials, with the phase separation into the liquid crystal component and the polymer composition, which is formed by polymerizing the above-mentioned liquid crystal/prepolymer composition.

28 Claims, 1 Drawing Sheet

LIQUID CRYSTAL PREPOLYMER COMPOSITION AND LIQUID CRYSTAL DISPLAY DEVICE USING THE SAME

BACKGROUND OF THE INVENTION

1. Field of the Invention

The present invention relates to a liquid crystal display device and, more particularly, to a macromolecular-dispersion type liquid crystal display device comprising a liquid-crystal-dispersed layer which comprises a polymer constituting a three-dimensional fine structure and a liquid crystal in the form of droplets dispersed in the polymer. The present invention also relates to a liquid crystal/prepolymer composition which is suitable for the preparation of the above-mentioned macromolecular-dispersion type liquid crystal display device.

2. Discussion of Background

Conventionally, a so-called macromolecular-dispersion type liquid crystal display device is known, which is prepared by holding a liquid-crystal-dispersed layer between a pair of support materials with electrodes. In the liquid-crystal-dispersed layer a liquid crystal in the form of droplets is dispersed in a matrix such as a resin, or a resin three-dimensional network structure is formed in the liquid crystal. The orientation of molecules of the liquid crystal for use in the above-mentioned macromolecular-dispersion type liquid crystal display device is in disorder by the influence of the surrounding matrix with no voltage being applied thereto, so that the light applied to the liquid crystal display device is scattered because of a slight fluctuation of refractive index. When the liquid crystal to be employed has a positive dielectric anisotropy, the molecules of the liquid crystal are oriented in the direction of an electrical field by the application of a voltage to the liquid crystal display device. In this case, the fluctuation of the refractive index of the liquid crystal is reduced, so that the liquid crystal display device assumes a transparent state.

In the case where a dichroic dyestuff is added to the liquid crystal for use in the macromolecular-dispersion type liquid crystal display device, the dyestuff is oriented at random and absorbs the light with no voltage being applied thereto. By the application of a voltage, the dyestuff is oriented perpendicularly to the support materials, and assumes a transparent state.

In any case, a polarizing plate, which is employed in the liquid crystal display device of the twisted nematic mode, is not necessary in the aforementioned macromolecular-dispersion type liquid crystal display device. Therefore, it is possible to clearly display the information in the macromolecular-dispersion type liquid crystal display device without the loss of light, that is, the absorption of light by the polarizing plate. In addition, the macromolecular-dispersion type liquid crystal display device has the advantage of high response speed.

To form such a dispersion structure of the liquid crystal display device, the following methods are proposed:

(1) Emulsion method: an emulsion comprising an aqueous solution of a water-soluble polymer such as polyvinyl alcohol and a liquid crystal is coated on a support material and dried.

(2) Solvent-evaporation method: a homogeneous solution is prepared by dissolving a soluble polymer and a liquid crystal in a solvent, and the solution thus prepared is coated on a support material, and dried so as to carry out the phase separation into a liquid crystal and a polymer.

(3) Photopolymerization method: a mixture of a photopolymerizable material such as an acrylic monomer, a liquid crystal and a photopolymerization initiator is encapsulated in a gap between upper and lower support materials. The encapsulated mixture is irradiated by the ultraviolet light to carry out the photopolymerization of the photopolymerizable material and cause the phase separation.

(4) Heat-polymerization method: a mixture of a heat-polymerizable material such as an epoxy compound, a curing agent therefor, and a liquid crystal is encapsulated in a gap between upper and lower support materials. The heat is applied to the encapsulated mixture to carry out the polymerization of the heat-polymerizable material and cause the phase separation.

The photopolymerization method (3) has been developed actively because the liquid-crystal-dispersed structure in the liquid crystal display device can be controlled, the reproducibility of the performance of the obtained liquid crystal display device is excellent, the thickness of the liquid-crystal-dispersed layer can easily be adjusted, and the application of this method (3) to the conventional manufacturing process is relatively easy. However, the macromolecular-dispersion type liquid crystal display device prepared by the photopolymerization method (3) has the following drawbacks:

(a) The threshold values are not clear and the operating voltage is high.

(b) The response speed becomes slow when the operating voltage is decreased. The low-voltage driving system and the high-speed response are not satisfied at the same time.

(c) There is a large hysteresis effect in the voltage-transmittance characteristics, so that it is difficult to display a half tone image on the display device.

(d) The charge holding ratio is so low that it is difficult to drive the liquid crystal display device by an active element such as a thin-film transistor.

It is considered that the aforementioned drawbacks (a) to (c) result from inadequate control of the dispersion structure of the liquid crystal, for example, in terms of the shape, the size and the distribution of a liquid crystal phase.

SUMMARY OF THE INVENTION

Accordingly, a first object of the present invention is to provide a macromolecular-dispersion type liquid crystal display device free from the conventional drawbacks, which can be driven by the application of a low voltage, and show clear threshold values, small hysteresis effect, high-speed response performance and high charge holding ratio.

A second object of the present invention is to provide a composition comprising a liquid crystal and a prepolymer, which is suitable for the preparation of the above-mentioned macromolecular-dispersion type liquid crystal display device.

The first object of the present invention can be achieved by a liquid crystal display device comprising a pair of support materials, and a liquid crystal/polymer composition held between the support materials, the liquid crystal/polymer composition comprising a liquid crystal component and a polymer composition, with phase separation into the liquid crystal component and the polymer composition, which is formed by polymerizing a liquid crystal/prepolymer composition which comprises a liquid crystal component, a prepolymer composition and a polymerization initiator, the liquid crystal/prepolymer composition, when polymerized, being capable of causing the phase separation, the prepolymer composition comprising (a) a monofunctional acrylate component having one double bond, with an HLB value of 2.5 to 7.0; and (b) a bifunctional acrylate component having two double bonds, with an HLB value of 3.5 to 11.

The second object of the present invention can be achieved by a liquid crystal/prepolymer composition which comprises a liquid crystal, a prepolymer composition and a polymerization initiator, the liquid crystal/ prepolymer composition, when polymerized, being capable of causing phase separation into the liquid crystal and a polymer, the prepolymer composition comprising a monofunctional acrylate component having one double bond, with an HLB value of 2.5 to 7.0 and a bifunctional acrylate component having two double bonds, with an HLB value of 3.5 to 11.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
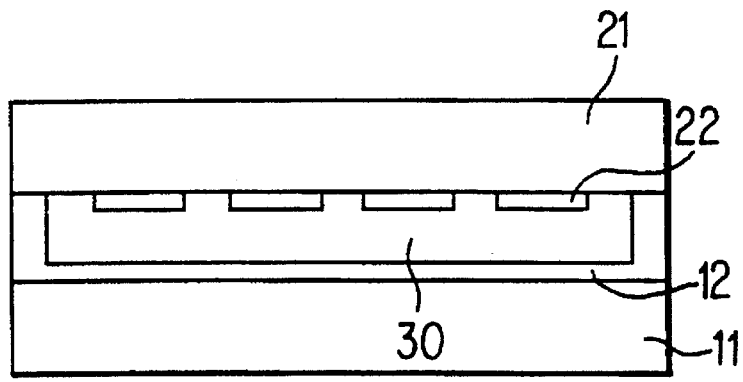
FIG. 1 is a schematic cross-sectional view of one embodiment of a liquid crystal display device according to the present invention.

A composition for preparation of a liquid crystal display device according to the present invention comprises (i) a liquid crystal component, (ii) a prepolymer composition, and (iii) a polymerization initiator which is capable of generating a radical seed by the application of heat or light thereto to induce the radical polymerization of the aforementioned prepolymer composition.

The composition comprising the liquid crystal, the prepolymer composition and the polymerization initiator according to the present invention (hereinafter referred to as a liquid crystal/prepolymer composition) is in a uniform condition at the initial stage. When the heat or light energy is applied to the liquid crystal/prepolymer composition, the molecular weight of the prepolymer increases with the progress of the polymerization reaction thereof and the crosslinking reaction proceeds. Consequently, the phase separation is carried out and the liquid crystal phase in the form of minute droplets is dispersed in a polymer phase.

Severe control of the size, the shape and the distribution of the droplets of the liquid crystal dispersed in the polymer phase is required because these factors have an important effect on the electro-optical characteristics of the obtained liquid crystal display device. In the liquid crystal/prepolymer composition according to the present invention the minute droplets of the liquid crystal can uniformly be dispersed in the polymer phase by the polymerization reaction of the prepolymer composition. A liquid crystal display device prepared by using the aforementioned liquid crystal/ prepolymer composition can be driven by the application of a low operating voltage, and the response speed is quick and the hysteresis effect can be reduced.

The above-mentioned advantages can be obtained from the liquid crystal display device of the present invention because the prepolymer composition for use in the liquid crystal/prepolymer composition of the present invention comprises a monofunctional acrylate component having one double bond, with an HLB value of 2.5 to 7.0 and a bifunctional acrylate component having two double bonds, with an HLB value of 3.5 to 11.

The HLB value, which is generally used to express the polar character of a surface active agent, can be calculated from the molecular structure of a material. The higher the HLB value, the higher the polar character. In the present invention the HLB value of the acrylate is commonly calculated in accordance with the following formula described in the literature "Interfacial Phenomena", Academic Press, New York (1961) by J. T. Davies and E. K. Rideal:

$$HLB = \Sigma(\text{group number of a hydrophilic group}) + \Sigma(\text{group number of a lipophilic group}) + 7$$

For instance, Table 1 shows the group numbers of the groups, which can be calculated from the molecular structure thereof.

TABLE 1

| Group | Group Number |
|---|---|
| —OH | 1.9 |
| —O— | 1.3 |
| —COO— | 2.4 |
| —CH— | −0.475 |
| —CH$_2$— | −0.475 |
| —CH$_3$ | −0.475 |
| =CH— | −0.475 |
| (CH$_2$CH$_2$O) | 0.33 |
| [CH(CH$_3$)CH$_2$O] | −0.15 |

To obtain the HLB of a compound which contains a group whose group number is not given, the method of W. C. Griffin described in the literature "Kirk-Othmer Encyclopedia of Chemical Technology", 3rd Ed., vol. 8, p.913–916, John Wiley (1979) is available.

The HLB of the monofunctional acrylate component for use in the prepolymer composition is in the range from 2.5 to 7.0, preferably in the range from 3 to 6.5, more preferably in the range from 3.2 to 5.5. When the HLB of the monofunctional acrylate component is more than 7.0, the light dispersion properties of the obtained liquid crystal display device are decreased when no voltage is applied thereto, and the operation voltage is elevated. When the HLB of the monofunctional acrylate component is less than 2.5, the light dispersion properties are decreased and the operating voltage is increased similarly. In addition, the initial light dispersion properties are decreased immediately after the application of a voltage to the liquid crystal display device.

Although the optimal HLB value of the monofunctional acrylate component for use in the prepolymer composition slightly varies depending on the kind and the concentration of liquid crystal to be employed in the liquid crystal/ prepolymer composition, and the ratio by weight of the monofunctional acrylate component to the bifunctional acrylate component in the prepolymer composition, excellent characteristics of the liquid crystal display device can be obtained when the monofunctional acrylate component with an HLB value of 2.5 to 7.0 is selected.

A variety of monofunctional acrylates can be employed for the monofunctional acrylate component. In particular, the monofunctional acrylates which can be synthesized and obtained with no difficulty are preferably employed. Furthermore, it is desirable that the vapor pressure of the employed monofunctional acrylate be low. This is because evaporation of the monofunctional acrylate with time and in the course of the manufacture of the display device can be prevented. To reduce the evaporation of the monofunctional acrylate, it is preferable that the monofunctional acrylate with a molecular weight of 200 or more, or containing an ether linkage in the structure thereof be employed in the present invention.

With the above-mentioned factors taken into consideration, the following monofunctional acrylates (1) and (2) are preferable in the present invention:

$$CH_2=CH-COO-(R^1-O-)_m-C_nH_{2n+1} \qquad (1)$$

wherein m is an integer of 0 to 6; $R^1$ is an alkylene group having 2 or 3 carbon atoms; and $C_nH_{2n+1}$ represents a branched or straight-chain alkyl group.

In the above formula (1), n is determined from m and $R^1$ so that the HLB value of the obtained monofunctional acrylate may be within the previously specified range. It is preferable that n be an integer from 5 to 14, and more preferably from 6 to 13. When m=0, it is desirable that n is an integer of 8 or more from the viewpoint of prevention of the evaporation of the obtained monofunctional acrylate.

For instance, when $R^1$ represents $-CH_2CH_2-$ and m=2, the HLB of the obtained monofunctional acrylate varies depending on the number of n as shown in Table 2.

TABLE 2

| Number of "n" | HLB of Monofunctional Acrylate |
|---|---|
| 4 | 7.2 |
| 5 | 6.9 |
| 6 | 6.3 |
| 8 | 5.3 |
| 10 | 4.4 |
| 12 | 3.4 |
| 13 | 3.0 |
| 14 | 2.5 |

$$CH_2=CH-COO-(-R^1-O-)_j-Ph-C_kH_{2k+1} \qquad (2)$$

wherein Ph is phenylene group; j is an integer of 0 to 6; $R^1$ is an alkylene group having 2 or 3 carbon atoms; and $C_kH_{2k+1}$ represents a branched or straight-chain alkyl group.

In the above formula (2), k is determined from j and $R^1$ so that the HLB value of the obtained monofunctional acrylate may be within the previously specified range. When j=0, it is desirable that k is an integer of 6 or more from the viewpoint of prevention of the evaporation of the obtained monofunctional acrylate. For instance, it is preferable that k be an integer from 6 to 14, and more preferably from 7 to 13 when $R^1$ represents $-CH_2CH_2-$ and j=1.

In the monofunctional acrylates (1) and (2) the HLB is controlled by a relatively long-chain alkyl group at the end. As long as the HLB of the monofunctional acrylate is within the previously specified range, it is not necessary to have such an alkyl group at the end.

For example, monofunctional acrylates (3) and (4) are also preferably employed in the present invention:

$$CH_2=CH-COO-(CH_2)_{10}-O-CH_3 \text{ (HLB=4.5)} \qquad (3)$$

$$CH_2=CH-COO-(CH_2)_{12}-OCOCH_3 \text{ (HLB=4.7)} \qquad (4)$$

Depending on the liquid crystal to be employed in the liquid crystal/prepolymer composition, it may be difficult to adequately control the characteristics of the obtained liquid crystal/prepolymer composition when one kind of monofunctional acrylate is employed for the monofunctional acrylate component. In such a case, the monofunctional acrylate component may comprise a mixture of at least two monofunctional acrylates. Even when a plurality of monofunctional acrylates are employed, the additive property of the HLB is satisfied. Accordingly, the HLB of a mixture of the monofunctional acrylates can freely be controlled by changing the composition ratios of the monofunctional acrylates depending on the liquid crystal to be employed in the liquid crystal/prepolymer composition of the present invention. Thus, excellent characteristics can be imparted to the liquid crystal display device according to the present invention.

The HLB of an n-components system of the monofunctional acrylates can be obtained in accordance with the following numerical formula (A):

$$HLB = \sum_{i=1}^{n}(HLB_i \cdot C_i) \qquad (A)$$

wherein $HLB_i$ represents the HLB value of the monofunctional component "i", and $C_i$ represents the weight fraction of the monofunctional component "i".

In the present invention, the HLB of a mixture of monofunctional acrylates is within the range from 2.5 to 7.0, as a matter of course. When a plurality of monofunctional acrylates are employed for the monofunctional acrylate component in the prepolymer composition, the HLB of each monofunctional acrylate is not particularly limited. For example, when the following monofunctional acrylates (5) and (6) having the HLB values of 1.8 and 6.0 respectively are mixed at a ratio by weight of 1:1, the HLB of the obtained mixture of the monofunctional acrylates reaches 3.9, so that the thus obtained mixture can preferably be employed in the present invention:

$$CH_2=CH-COO-(CH_2)_{13}CH_3 \text{ (HLB=1.8)} \qquad (5)$$

$$CH_2=CH-COO-(CH_2CH_2-O)_4-(CH_2)_7CH_3 \text{ (HLB=6.0)} \qquad (6)$$

A variety of monofunctional acrylates can be used in combination. In particular, monofunctional acrylates represented by the following formulas (7) and (8) are preferred when used in combination because they can be obtained and synthesized with no difficulty and the vapor pressure of each monofunctional acrylate is low.

$$CH_2=CH-COO-(R^1-O-)_p-C_qH_{2q-1} \qquad (7)$$

wherein p is an integer of 0 to 6; and q is an integer of 8 to 18 when p=0, q is an integer of 6 to 18 when p=1, and q is an integer of 1 to 18, preferably 4 to 18 when p is an integer in the range from 2 to 6.

$$CH_2=CH-COO(CH_2CH_2O-)_u-Ph-C_vH_{2v+1} \qquad (8)$$

wherein u is an integer of 0 to 6; and v is an integer of 4 to 18.

In addition, monofunctional acrylates containing a cyclic aliphatic group such as isobornyl group, norbornyl group, adamantane ring, or cyclohexyl group can also be employed for the monofunctional acrylate component in the prepolymer composition. Specific examples of the monofunctional acrylate containing a cyclic aliphatic group are as follows:

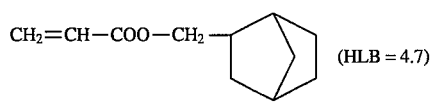 (9)

 (10)

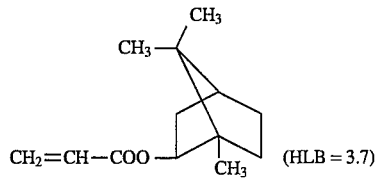 (11)

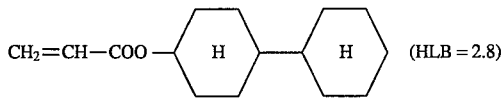 (12)

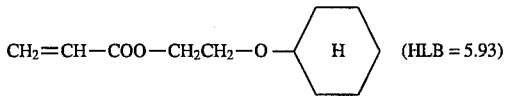 (13)

The amount of the monofunctional acrylate component, which depends upon the kind of monofunctional acrylate and the kind of polyfunctional acrylate to be employed in the prepolymer composition, is preferably in the range from 20 to 80 wt. %, more preferably in the range from 30 to 70 wt. % of the total weight of the prepolymer composition. When the amount of the monofunctional acrylate component is within the above-mentioned range, the hysteresis effect can be reduced, the size and the shape of droplets of the liquid crystal dispersed in the obtained liquid crystal display device can appropriately be controlled to prevent the decrease of the light dispersion properties, and the operating voltage can be decreased. In addition, the polymerization reaction can be carried out at a proper speed, so that the liquid crystal droplets of a proper size can be obtained, thereby forming a desired liquid-crystal-dispersed structure.

In the prepolymer composition for use in the present invention a bifunctional acrylate having two double bonds, with an HLB value ranging from 3.5 to 11.0, preferably from 4.0 to 10, is used in combination with the above-mentioned monofunctional acrylate component.

Examples of the bifunctional acrylate for use in the present invention include an urethane acrylate, ester acrylate, ether acrylate, and alkyl acrylate.

The following bifunctional acrylates can preferably be employed for the bifunctional acrylate component in the prepolymer composition:

$$CH_2=CH-CO-R^2-CO-CH=CH_2 \quad (14)$$

In the above formula (14), the following examples (A) to (E) can be used as $R^2$:

(A) —O(CH$_2$CH$_2$—O)$_n$— (n=2~5)
Examples of the moiety (A) are as follows:

—O(CH$_2$CH$_2$=O)$_4$—, and

—O(CH$_2$CH$_2$—O)$_3$—.

(B) —O[CH(CH$_3$)CH$_2$—O]$_n$— (n≈2~16)
Examples of the moiety (B) are as follows:

—O[CH(CH$_3$)CH$_2$—O]$_3$—, and

—O[CH(CH$_3$)CH$_2$—O]$_6$—.

(C) Alkyl group having 6 to 12 carbon atoms which may include a cyclic alkyl group.
Examples of the moiety (C) are as follows:

—O—CH$_2$—C(CH$_3$)$_2$—CH$_2$—O—, and

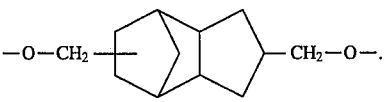

(D) —O—R$^3$—COO—R$^4$—O— wherein R$^3$ is an alkylene group represented by C$_n$H$_{2n}$ and R$^4$ is an alkylene group represented by C$_n$H$_{2n}$, provided that n and m are integers of 2 or more and the sum of m and n is in the range from 5 to 18.
Examples of the moiety (D) are as follows:

—O—CH$_2$—C(CH$_3$)$_2$—CH$_2$—OCO—C(CH$_3$)$_2$—CH$_2$—O—, and

—O—CH$_2$—C(CH$_3$)$_2$—CH$_2$—OCO—(CH$_2$)$_5$—O—.

(E) —O—R$^3$—X—R$^4$—X—R$^5$(—X—R$^6$—)$_i$—(X—R$^7$)$_j$—O— wherein X is —COO— or —OCO—; i and j are integers of 0 or 1; R$^3$ to R$^7$ each is an alkylene group having 2 or more carbon atoms or a cyclic alkyl group provided that at least two of R$^3$, R$^4$, R$^5$, R$^6$ and R$^7$ are alkylene groups and the total number of carbon atoms of alkylene groups and cyclic alkyl groups is 24 or less.
Examples of the moiety (E) are as follows:

—O—(CH$_2$)$_5$—COO—CH$_2$—C(CH$_3$)$_2$—COO—CH$_2$—

—C(CH$_3$)$_2$—CH$_2$—OCO—(CH$_2$)$_5$—O—,

—O—(CH$_2$)$_6$—OCO—(CH$_2$)$_4$—COO—(CH$_2$)$_6$—O—,

—O—(CH$_2$)$_6$—OCO—(CH$_2$)$_4$—COO—(CH$_2$)$_6$—OCO—

—(CH$_2$)$_4$—COO—(CH$_2$)$_6$—O—,

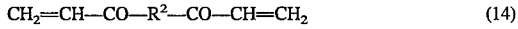, and

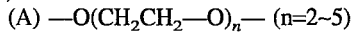

Other examples of the bifunctional acrylate for use in the prepolymer composition include compounds (15) to (19):

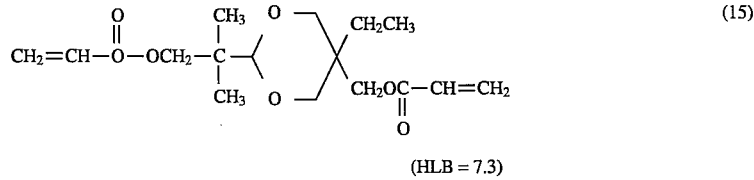 (15)

(HLB = 7.3)

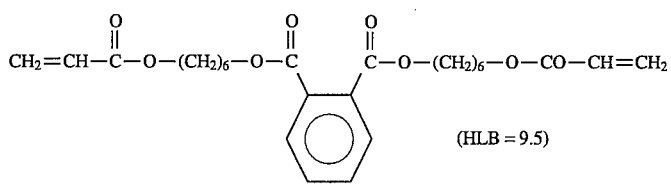

(16) (HLB = 9.5)

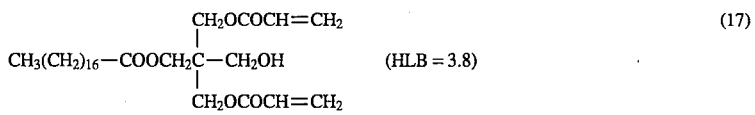

(17) (HLB = 3.8)

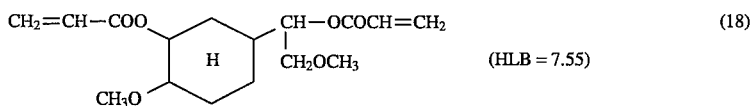

(18) (HLB = 7.55)

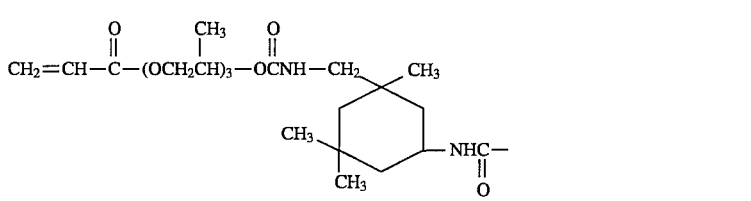

(19)

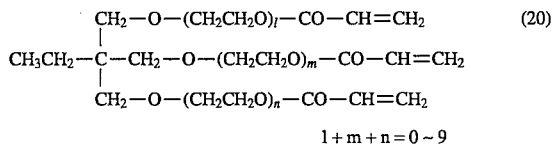

(HLB = 5.8)

The bifunctional acrylate component may comprise a mixture of at least two bifunctional acrylates to adjust the HLB value and control the crosslink density. When a plurality of bifunctional acrylates are employed, it is necessary that the HLB of a mixture of bifunctional acrylates be in the range from 3.5 to 11.0.

Furthermore, a polyfunctional acrylate with at least three functional groups may be contained in the prepolymer composition. The amount of the polyfunctional acrylate is preferably in the range of 8 wt. % or less, more preferably 6 wt. % or less, further preferably 5 wt. % or less of the total weight of the obtained prepolymer composition. The lower limit of the amount of the polyfunctional acrylate, which varies depending on the kind of polyfunctional acrylate to be employed, is preferably 0.2 wt. % of the total weight of the prepolymer composition. In the case where the polyfunctional acrylate is contained in the prepolymer composition in an amount of up to 8 wt. % of the total weight of the prepolymer composition, the hysteresis effect can efficiently be reduced and the response speed can be improved although the operating voltage is slightly increased. Therefore, the addition of the polyfunctional acrylate to the prepolymer composition is very effective for the special application of the liquid crystal display device which requires high-speed response and low hysteresis effect.

For instance, trifunctional acrylates and tetrafunctional acrylates can be employed as the polyfunctional acrylates. Specific examples of the polyfunctional acrylate for use in the present invention are as follows:

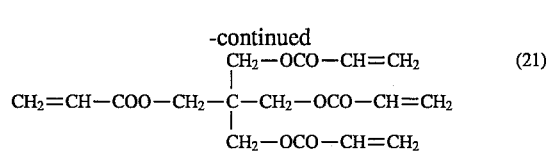

(20)

$1 + m + n = 0 \sim 9$

-continued

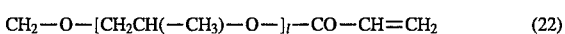

(21)

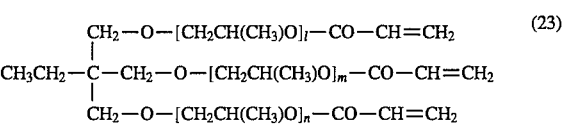

(22)

$1 + m + n = 0 \sim 9$ $$\begin{array}{c} CH_2-O-[CH_2CH(CH_3)O]_l-CO-CH=CH_2 \\ | \\ CH_3CH_2-C-CH_2-O-[CH_2CH(CH_3)O]_m-CO-CH=CH_2 \\ | \\ CH_2-O-[CH_2CH(CH_3)O]_n-CO-CH=CH_2 \end{array}$$ (23)

$1 + m + n = 0 \sim 9$

In addition to the above-mentioned polyfunctional acrylates (20) to (23), polyfunctional polyester acrylates and polyurethane acrylates can also be employed. The more the number of functional groups in the polyfunctional acrylate, the higher the operating voltage of the obtained liquid crystal display device. Therefore, the trifunctional acrylate is most preferable when the polyfunctional acrylate is contained in the prepolymer composition.

The liquid crystal/prepolymer composition according to the present invention comprises a polymerization initiator. In particular, a photopolymerization initiator is preferable from the viewpoints of convenience of the polymerization reaction, the controllability of the liquid-crystal-dispersed structure in the obtained liquid crystal display device, and the preservability of the liquid crystal/prepolymer composition. Any conventional photopolymerization initiator can be used in the present invention. For example, biacetyl, acetophenone, benzophenone, Michler's ketone, benzil, benzoin alkyl ether, benzyldimethylketol, 1-hydroxy-2-methyl-1-phenylpropane-1-on, 2-chlorothioxanthone, methylbenzoyl formate, 1-(4-isopropylphenyl)-2-hydroxy-2-methylpropane-1-on, diethoxyacetophenone, 1-hydroxycyclohexylphenyl ketone, and 2,2-dimethoxy-1,2-diphenylethane-1-on can be employed as the photopolymerization initiator. In particular, benzoin alkyl ethers such as benzoin ethyl ether, benzoin butyl ether and benzoin isopropyl ether, 1-hydroxycyclohexylphenyl ketone, and 2,2-dimethoxy-1,2-diphenylethane-1-on are preferred from the viewpoints of high reliability and high charge holding ratio of the obtained liquid crystal display device.

It is preferable that the amount of the polymerization initiator be in the range from 1 to 10 parts by weight, more preferably 1.5 to 8 parts by weight, to 100 parts by weight of the total amount of the prepolymer composition. When the amount of the polymerization initiator is within the above range, the polymer phase and the liquid crystal phase can readily be separated by the application of ultraviolet light to the liquid crystal/prepolymer composition, with the size of the liquid crystal phase in the form of droplets being appropriately controlled. Therefore, the decrease of the light dispersion properties of the obtained liquid crystal display device can be prevented, and at the same time, the liquid crystal display device can be driven by the application of a low voltage and the decrease of the charge holding ratio can be avoided.

The liquid crystal/prepolymer composition according to the present invention comprises a liquid crystal component.

In the present invention a nematic liquid crystal composition with a positive dielectric anisotropy is preferably employed. The liquid crystal for use in the above-mentioned nematic liquid crystal composition comprises as a skeleton biphenyl, terphenyl, phenylcyclohexane, biphenylcyclohexane, phenyl benzoate, phenyl cyclohexanecarboxylate, phenyl pyrimidine, phenyl dioxane, tolane, 1-phenyl-2-cyclohexyl-ethane, 1-phenyl-2-biphenyl-ethane, 1-cyclohexyl-2-biphenyl-ethane, phenyl biphenylcarboxylate, or phenyl 4-cyclohexylbenzoate. In addition, the liquid crystal comprises an alkyl group, an alkoxyl group, and a polarity-imparting group, that is, a group capable of providing the liquid crystal component with the positive dielectric anisotropy, such as cyano group or a halogen, each of which is placed as a substituent in the major axis direction of a molecule. The dielectric anisotropy of all the liquid crystals constituting the liquid crystal composition may be positive. Alternatively, the liquid crystals with positive dielectric anisotropy and the ones with negative dielectric anisotropy may be mixed to form a liquid crystal composition with the positive dielectric anisotropy.

The liquid crystal display device is required to have high charge holding ratio when it is driven by an active element such as a thin-film transistor. In such a case, it is necessary to employ a liquid crystal with a high resistivity. Therefore, the liquid crystal with a polarity-imparting group such as a halogen is preferably used.

When the nematic liquid crystal composition with a positive dielectric anisotropy comprising a liquid crystal with a positive dielectric anisotropy having a halogen as a polar-imparting group is employed, and the polymerization initiator selected from the group consisting of benzoin alkyl ether, 1-hydroxycyclohexyl-phenyl ketone and 2,2-dimethoxy-1,2-dimethoxy-1,2-diphenylethane-1-on is employed for the liquid crystal/prepolymer composition of the present invention, the obtained liquid crystal/prepolymer composition becomes remarkably suitable for a liquid crystal display device driven by an active element.

It is preferable that the amount of the liquid crystal component be in the range from 70 to 90 wt. %, more preferably in the range from 70 to 85 wt. % of the total weight of the liquid crystal/prepolymer composition according to the present invention. When the amount of the liquid crystal component is within the above range, the increase of the operating voltage for the obtained liquid crystal display device can be prevented, and at the same time, the phase separation into the polymer and the liquid crystal can readily be induced by the application of ultraviolet light, with the size of the liquid crystal phase in the form of droplets being appropriately controlled to prevent the decrease of the light dispersion properties of the liquid crystal display device.

Furthermore, the liquid crystal/prepolymer composition according to the present invention may further comprise a dichroic dyestuff. When the macromolecular-dispersion type liquid crystal display device is prepared by using the liquid crystal/prepolymer composition comprising the above-mentioned dichroic dyestuff, it is possible to drive the liquid crystal display device in the guest-host mode. In addition, the liquid crystal/prepolymer composition according to the present invention may further comprise a photosensitizer by which the photosensitivity of the liquid crystal/prepolymer composition to the wavelength can be controlled.

Using the previously mentioned liquid crystal/prepolymer composition, a macromolecular-dispersion type liquid crystal display device according to the present invention can be fabricated by the following method: the aforementioned liquid crystal/prepolymer composition of the present invention is placed in a cell which is provided between light-transmitting support materials such as glass plates provided with the respective picture element electrodes. Then, the cell containing the liquid crystal/prepolymer composition of the present invention is irradiated by the ultraviolet light. Alternatively, the liquid crystal/prepolymer composition is applied to one support material and the other support material is superimposed thereon, followed by the irradiation by the ultraviolet light. Or the liquid crystal/prepolymer composition is coated on one support material and exposed to the ultraviolet light. Thereafter the other support material is overlaid on the liquid crystal/prepolymer composition.

The wavelength of the ultraviolet light applied to the liquid crystal/prepolymer composition, which depends on the kind of polymerization initiator for use in the composition, is preferably in the range from 300 to 420 nm, and more preferably in the range from 330 to 400 nm. The intensity of the ultraviolet light is preferably in the range from 20 to 300 mW/cm$^2$. The temperature of the liquid crystal/prepolymer composition when the composition is exposed to the ultraviolet light, namely, the polymerization temperature, is determined from the temperature at which the phase separation into the polymer phase and the liquid crystal phase is induced in the polymerization reaction (hereinafter referred to as the phase-separation temperature). The phase-separation temperature for use in the present invention is a maximum temperature below which the liquid crystal phase can be dispersed in the polymer phase. It is necessary that the polymerization be carried out at a temperature higher than the phase-separation temperature and up to 20° C. higher than the phase-separation temperature. When the polymerization is carried out at a temperature within the above-specified temperature region, the liquid-crystal-dispersed structure can uniformly be formed in the liquid crystal display device and the extreme increase of the operating voltage can be prevented.

The liquid crystal display device according to the present invention comprises a pair of support materials, and a liquid crystal/polymer composition held between the support materials, the liquid crystal/polymer composition comprising a liquid crystal component and a polymer composition, with phase separation into the liquid crystal component and the polymer composition, which is formed by polymerizing a liquid crystal/prepolymer composition which comprises a liquid crystal component, a prepolymer composition and a polymerization initiator, the liquid crystal/prepolymer composition, when polymerized, being capable of causing the phase separation, the prepolymer composition comprising a monofunctional acrylate component having one double bond, with an HLB value of 2.5 to 7.0; and a bifunctional acrylate component having two double bonds, with an HLB value of 3.5 to 11.

FIG. 1 is a schematic cross-sectional view of one embodiment of a liquid crystal display device according to the present invention.

As shown in FIG. 1, support materials 11 and 21 which have electrodes 12 and 22 respectively thereon are mutually directed with a minute gap maintained therebetween. A liquid crystal/prepolymer composition 30 according to the present invention is encapsulated in the minute gap between the support materials 11 and 21.

Figure 2:
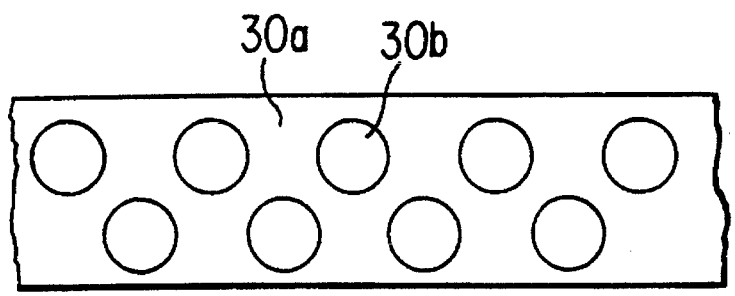
FIG. 2 is a schematic cross-sectional view of a liquid-crystal-dispersed layer of the display device as shown in FIG. 1 in explanation of the structure of the liquid-crystal-dispersed layer.

The cross-sectional structure of a layer of a liquid crystal/prepolymer composition 30 as shown in FIG. 1 is schematically illustrated in FIG. 2. A polymer phase obtained by polymerizing the aforementioned prepolymer composition forms a matrix 30a, and droplets of the liquid crystal 30b are dispersed in the polymer matrix 30a. The orientation of the droplets of the liquid crystal is random by the influence of the matrix 30a enclosing the droplets of the liquid crystal 30b with no application of a voltage thereto. When a voltage is applied across the upper and lower electrodes 12 and 22, the droplets of the liquid crystal 30b are oriented in a predetermined direction, whereby the liquid crystal display device becomes ready for displaying information.

The liquid crystal display device according to the present invention has the following advantages:

(1) The hysteresis effect in the voltage-transmittance characteristics can be reduced.

(2) It is possible to drive the liquid crystal display device by the application of a low voltage.

(3) The light dispersion properties are excellent when no voltage is applied to the display device.

(4) The high-speed response can be achieved.

The thickness of the layer of the liquid crystal/prepolymer composition 30 provided between the support materials 11 and 21 is preferably in the range from 3 to 30 μm, and more preferably in the range from 3 to 15 μm from the aspects of the driving voltage and the obtained contrast. When the thickness of the layer of the liquid crystal/prepolymer composition 30 is within the above range, the increase of the driving voltage can be prevented and sharp contrast can be obtained.

In addition, it is preferable that the diameter of a droplet of the liquid crystal 30b be in the range from 0.5 to 4 μm, and more preferably in the range from 1.5 to 3.5 μm. When the size of the droplets of the liquid crystal 30b can be maintained within the above range, the decrease of the contrast can be prevented, and the driving voltage can be decreased. Further, the decrease of the response speed can be avoided.

Other features of this invention will become apparent in the course of the following description of exemplary embodiments, which are given for illustration of the invention and are not intended to be limiting thereof.

EXAMPLE 1

A monofunctional acrylate M1 with an HLB of 5.3 as shown in Table 3, and a bifunctional acrylate D1 with an HLB of 10.0 as shown in Table 4 were mixed at a ratio by weight of 50:50. Then, 3 parts by weight of 2-hydroxy-2-methyl-1-phenylpropane-1-on serving as a photopolymerization initiator were added to 100 parts by weight of the above mixture of the acrylates to form a polymerizable prepolymer composition A. A commercially available cyano-biphenyl based liquid crystal "BL007" (Trademark), made by Merck Ltd., was added to the prepolymer composition A to prepare a liquid crystal/prepolymer composition A so that the concentration of the liquid crystal was 75 wt. % of the total weight of the obtained liquid crystal/prepolymer composition A.

Two glass supports, each of which has a transparent electroconductive film serving as an electrode thereon, were laminated with 7-μm-thick spacers inserted between the glass supports. Then, two end portions of the supports were fixed using an adhesive.

The above prepared liquid crystal/prepolymer composition A was injected into the gap between the glass supports and irradiated by the ultraviolet light using a high-pressure mercury vapor lamp. While the liquid crystal/prepolymer composition A was injected into the gap between the supports and irradiated by the ultraviolet light, the temperature of the composition A was maintained higher than the phase-separation temperature of the composition A by 5° to 10° C. The light energy was set at 80 mW/cm$^2$.

Thus, a liquid crystal display device No. 1 according to the present invention was fabricated.

Using an optical measuring system with an aperture angle of 20°, the voltage-transmittance characteristics and the response speed of the liquid crystal display device No. 1 according to the present invention were evaluated.

The evaluating items were as follows:

T (0 V): a transmittance of the liquid crystal display device with no application of a voltage thereto.

V10: a voltage corresponding to a transmittance which was increased from the transmittance T (0 V) by 10% with respect to the entire variation in transmittance.

V50: a voltage corresponding to a transmittance which was increased from the transmittance T (0 V) by 50% with respect to the entire variation in transmittance.

V90: a voltage corresponding to a transmittance which was increased from the transmittance T (0 V). by 90% with respect to the entire variation in transmittance.

γ: a parameter indicating the sharpness of the voltage-transmittance characteristics, expressed by V90/V10.

H: a parameter indicating the degree of the hysteresis in the voltage-transmittance characteristics, expressed by ΔV50/V50. ΔV50 is a difference between a value of V50 obtained while the voltage was increasing and a value of V50 obtained while the voltage was decreasing.

Response time: the sum of a rise time and a decay time. The rise time is a period of time until the transmittance increased from 0 to 90% with respect to the entire variation in transmittance. The decay time is a period of time until the transmittance decreased from 100 to 10% with respect to the entire variation in transmittance.

The evaluation results of the liquid crystal display device No. 1 according to the present invention obtained in Example 1 were as follows:

T (0 V): 8%
V90: 14 V
γ: 3.8

H: 9%
Response speed: 34 ms

TABLE 3

| | | |
|---|---|---|
| M1 | $CH_2=CH-COO-CH_2CH_2O-CH_2CH_2O-$<br>$-CH_2CH(-CH_2CH_3)CH_2CH_2CH_2CH_3$ | (HLB = 5.3) |
| M2 | $CH_2=CH-COO-(CH_2)_9CH_3$ | (HLB = 3.7) |
| M3 | $CH_2=CH-COO-(CH_2CH_2O)_3-(CH_2)_{11}CH_3$ | (HLB = 4.2) |
| M4 | 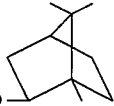 | (HLB = 5.2) |
| M5 | | (HLB = 4.4) |
| M6 | $CH_2=CH-COO-(CH_2CH_2O)_2-CH_2CH_3$ | (HLB = 8.2) |
| M7 | $CH_2=CH-COO-(CH_2)_{13}CH_3$ | (HLB = 1.8) |
| M8 | $CH_2=CH-COO-CH_2CH_2-OH$ | (HLB = 9.4) |
| M9 | | (HLB = 3.7) |
| M10 | $CH_2=CH-COO-(CH_2)_{11}CH_3$ | (HLB = 2.8) |
| M11 | $CH_2=CH-COO-(CH_2)_{17}CH_3$ | (HLB = 0) |

M4: $CH_2=CH-COO-(CH_2CH_2O)_2-\langle\bigcirc\rangle-(CH_2)_5CH_3$

M5: $CH_2=CH-COO-[CH_2CH(-CH_3)O]_4-\langle\bigcirc\rangle-(CH_2)_8CH_3$

M9: $CH_2=CH-COO-$ (norbornyl group)

TABLE 4

| | | |
|---|---|---|
| D1 | $CH_2=CH-COO-CH_2CH_2-OCO-\langle H\rangle-COO-CH_2CH_2-OCO-CH=CH_2$ | (HLB = 10.0) |
| D2 | $CH_2=CH-COO-[CH(-CH_3)CH_2O]_7-CO-CH=CH_2$ | (HLB = 7.6) |
| D3 | $CH_2=CH-COO-[CH(-CH_3)CH_2O]_3-CO-CH=CH_3$ | (HLB = 8.2) |
| D4 | $CH_2=CH-COO-CH_2C(CH_3)_2-CH_2-OCO-C(CH_3)_2-CH_2-$ | (HLB = 8.5) |
| D5 | $CH_2=CH-COO-(CH_2)_5-COOCH_2C(CH_3)_2-COO-CH_2C(CH_3)_2CH-OCO-(CH_2)_5-OCO-CH=CH_2$ | (HLB = 8.1) |
| D6 | $CH_2=CH-COO-(CH_2CH_2O-)_4-OCO-CH=CH_2$ | (HLB = 9.9) |
| D7 | $CH_2=CH-COO-(CH_2CH_2-O-)_9-OCO-CH=CH_2$ | (HLB = 11.6) |
| D8 | $CH_2=CH-COO-(CH_2)_{14}-OCO-CH=CH_2$ | (HLB = 3.3) |
| D9 |  | (HLB = 4.2) |

D9: $CH_2=CH-COO-CH_2-$ (dicyclic group) $-CH_2-OCO-CH=CH_2$

EXAMPLES 2 TO 5

The procedure for preparation of the liquid crystal display device No. 1 of the present invention in Example 1 was repeated except that the monofunctional acrylate M1 for use in the polymerizable prepolymer composition A in Example 1 was replaced by the respective monofunctional acrylates M2 to M5 as shown in Table 3.

Thus, liquid crystal display devices No. 2 to No. 5 according to the present invention were obtained.

The voltage-transmittance characteristics and the response speed of each liquid crystal display device were evaluated in the same manner as in Example 1. As a result, excellent characteristics similar to those of the liquid crystal display device No. 1 according to the present invention were obtained.

COMPARATIVE EXAMPLES 1 TO 3

The procedure for preparation of the liquid crystal display device No. 1 of the present invention in Example 1 was repeated except that the monofunctional acrylate M1 for use in the polymerizable prepolymer composition A in Example 1 was replaced by the respective monofunctional acrylates M6 to M8 as shown in Table 3.

Thus, comparative liquid crystal display devices No. 1 to No. 3 were obtained.

The voltage-transmittance characteristics and the response speed of each comparative liquid crystal display device were evaluated in the same manner as in Example 1.

As a result, V90 was as high as 18 V although T (0 V) was 10% in Comparative Example 1.

The value of T (0 V) was as high as 30% in the comparative liquid crystal display device No. 2 obtained in Comparative Example 2, which indicated extremely poor light dispersion properties.

The evaluation results of the comparative liquid crystal display device No. 3 obtained in Comparative Example 3 were as follows:

T (0 V): 40%
V90: 23 V
H: 18%
Response speed: 370 ms

As can be seen from the above-mentioned data, the operating voltage was high, the light dispersion properties were low, the hysteresis effect in the voltage-transmittance characteristics was conspicuous, and the response speed was extremely slow.

EXAMPLE 6

The procedure for preparation of the liquid crystal display device No. 1 of the present invention in Example 1 was repeated except that the monofunctional acrylate M1 for use in the polymerizable prepolymer composition A in Example 1 was replaced by a mixture of the monofunctional acrylate M6 and the monofunctional acrylate M7 at a mixing ratio by weight of 1:1. The HLB of such a mixture of these monofunctional acrylates M6 and M7 was 5.0.

Thus, a liquid crystal display device No. 6 according to the present invention was obtained.

The voltage-transmittance characteristics and the response speed of the liquid crystal display device No. 6 according to the present invention were evaluated in the same manner as in Example 1. As a result, excellent characteristics similar to those of the liquid crystal display device No. 1 of the present invention were obtained.

EXAMPLES 7 TO 11

The procedure for preparation of the liquid crystal display device No. 1 of the present invention in Example 1 was repeated except that the bifunctional acrylate D1 for use in the polymerizable prepolymer composition A in Example 1 was replaced by the respective bifunctional acrylates D2 to D6 as shown in Table 4.

Thus, liquid crystal display devices No. 7 to No. 11 according to the present invention were obtained.

The voltage-transmittance characteristics and the response speed of each liquid crystal display device were evaluated in the same manner as in Example 1.

As can be seen from the data shown in Table 5, excellent characteristics similar to those of the liquid crystal display device No. 1 of the present invention were obtained in all the liquid crystal display devices Nos. 7 to 11.

TABLE 5

| Example No. | DA (*) | T (0V) (%) | V90 (V) | $\gamma$ | H (%) | Response Speed (ms) |
|---|---|---|---|---|---|---|
| Ex. 7 | D2 | 7 | 12 | 2.6 | 9 | 60 |
| Ex. 8 | D3 | 5 | 8 | 2.3 | 9 | 49 |
| Ex. 9 | D4 | 4 | 9 | 2.5 | 10 | 42 |
| Ex. 10 | D5 | 9 | 9 | 3.5 | 8 | 40 |
| Ex. 11 | D6 | 5 | 13 | 3.0 | 12 | 20 |

(*) DA: bifunctional acrylate

COMPARATIVE EXAMPLES 4 AND 5

The procedure for preparation of the liquid crystal display device No. 1 of the present invention in Example 1 was repeated except that the bifunctional acrylate D1 for use in the polymerizable prepolymer composition A in Example 1 was replaced by the respective bifunctional acrylates D7 and D8 as shown in Table 4.

Thus, comparative liquid crystal display devices No. 4 and No. 5 were obtained.

The voltage-transmittance characteristics and the response speed of each comparative liquid crystal display device were evaluated in the same manner as in Example 1.

As a result, the value of V90 was as high as 19 V in both cases, so that it was confirmed that the operating voltage was increased.

EXAMPLE 12

A monofunctional acrylate M1 with an HLB of 5.3 as shown in Table 3, and a bifunctional acrylate D3 with an HLB of 8.2 as shown in Table 4 were mixed at a ratio by weight of 50:50. Then, 3 parts by weight of benzoin propyl ether serving as a photopolymerization initiator were added to 100 parts by weight of the above mixture of the acrylates to form a polymerizable prepolymer composition B. A commercially available halogenated-terphenyl based liquid crystal "TL202" (Trademark), made by Merck Ltd., was added to the prepolymer composition B to prepare a liquid crystal/prepolymer composition B so that the concentration of the liquid crystal was 75 wt. % of the total weight of the obtained liquid crystal/prepolymer composition B.

Using the above prepared liquid crystal/prepolymer composition B, a liquid crystal display device No. 12 according to the present invention was fabricated in the same manner as in Example 1.

The voltage-transmittance characteristics and the response speed of the liquid crystal display device No. 12 of the present invention were evaluated in the same manner as in Example 1. The results were as follows:

T (0 V): 8%
V90: 10 V
$\gamma$: 2.1
H: 8%
Response speed: 22 ms

In addition, the charge holding ratio of the display device No. 12 of the present invention was 95% or more when measured by use of a measuring signal of 10 V and 30 Hz. Such a charge holding ratio was scarcely changed by the application of the light of 150000 lux to the display device No. 12 in a light-resistance test.

EXAMPLES 13 TO 21

The procedure for preparation of the liquid crystal display device No. 12 of the present invention in Example 12 was repeated except that the monofunctional acrylate M1 and the bifunctional acrylate D3 for use in the polymerizable prepolymer composition B in Example 12 were replaced by the respective monofunctional acrylates and bifunctional acrylates as shown in Table 6.

Thus, liquid crystal display devices No. 13 to No. 21 according to the present invention were obtained.

The voltage-transmittance characteristics and the response speed of each liquid crystal display device were evaluated in the same manner as in Example 1.

As can be seen from the data shown in Table 6, excellent characteristics similar to those of the liquid crystal display device No. 12 of the present invention were obtained in all the liquid crystal display devices Nos. 13 to 21.

TABLE 6

| Example No. | DA (*) | MA (*) | T (0V) (%) | V90 (V) | γ | H (%) | Response Speed (ms) |
|---|---|---|---|---|---|---|---|
| Ex. 13 | D3 | M2 | 8 | 7 | 2.0 | 3 | 45 |
| Ex. 14 | D3 | M3 | 9 | 8 | 2.0 | 5 | 50 |
| Ex. 15 | D3 | M4 | 7 | 11 | 2.1 | 12 | 46 |
| Ex. 16 | D3 | M5 | 9 | 10 | 2.4 | 12 | 50 |
| Ex. 17 | D3 | M9 | 10 | 9 | 1.9 | 12 | 70 |
| Ex. 18 | D1 | M1 | 15 | 9 | 3.0 | 3 | 60 |
| Ex. 19 | D2 | M1 | 10 | 8 | 2.1 | 8 | 38 |
| Ex. 20 | D4 | M1 | 7 | 8 | 2.1 | 10 | 32 |
| Ex. 21 | D5 | M1 | 10 | 8 | 2.3 | 10 | 33 |

(*)DA: bifunctional acrylate
MA: monofunctional acrylate

EXAMPLE 22

The procedure for preparation of the liquid crystal display device No. 12 of the present invention in Example 12 was repeated except that the mixture of the monofunctional acrylate M1 and the bifunctional acrylate D3 for use in the polymerizable prepolymer composition B in Example 12 was replaced by a mixture of a monofunctional acrylate M1 with an HLB of 5.3 as shown in Table 3 and a bifunctional acrylate D9 with an HLB of 4.2 as shown in Table 4 at a mixing ratio by weight of 70:30.

Thus, a liquid crystal display device No. 22 according to the present invention was obtained.

The voltage-transmittance characteristics and the response speed of the liquid crystal display device No. 22 according to the present invention were evaluated in the same manner as in Example 1. The results were as follows:
T (0 V): 9%
V90: 8 V
γ: 2.2
H: 7%
Response speed: 31 ms

EXAMPLE 23

The procedure for preparation of the liquid crystal display device No. 12 of the present invention in Example 12 was repeated except that the monofunctional acrylate M1 for use in the polymerizable prepolymer composition B in Example 12 was replaced by a mixture of a monofunctional acrylate M1 with an HLB of 5.3 and a monofunctional acrylate M10 with an HLB of 2.8 as shown in Table 3 at a mixing ratio by weight of 1:1.

Thus, a liquid crystal display device No. 23 according to the present invention was obtained.

The voltage-transmittance characteristics and the response speed of the liquid crystal display device No. 23 according to the present invention were evaluated in the same manner as in Example 1. The results were as follows:
T(0 V): 8%
V90: 7 V
γ:1.8
H: 5%
Response speed: 43 ms

Comparative Examples 6 and 7

The procedure for preparation of the liquid crystal display device No. 12 of the present invention in Example 12 was repeated except that the monofunctional acrylate M1 for use in the polymerizable prepolymer composition B in Example 12 was respectively replaced by a monofunctional acrylate M11 with an HLB of 0, and a monofunctional acrylate M6 with an HLB of 8.2, as shown in Table 3.

Thus, comparative liquid crystal display devices No. 6 and No. 7 were obtained.

The voltage-transmittance characteristics and the response speed of each comparative liquid crystal display device were evaluated in the same manner as in Example 1. The results were shown in Table 7.

TABLE 7

| Example No. | DA | MA | T (V) | V90 |
|---|---|---|---|---|
| Comp. Ex. 6 | D3 | M11 | 15 | 25 |
| Comp. Ex. 7 | D3 | M6 | 22 | 25 |

The voltage-transmittance characteristics of the comparative liquid crystal display devices No. 6 and No. 7 were not saturated by the application of a voltage of 30 V. Furthermore, the light dispersion properties were extremely poor when no voltage was applied to each comparative display device.

EXAMPLES 24 TO 27

The procedure for preparation of the liquid crystal display device No. 12 of the present invention in Example 12 was repeated except that benzoin propyl ether serving as the polymerization initiator for use in the polymerizable prepolymer composition B in Example 12 was respectively replaced by benzoin ethyl ether, benzoin butyl ether, 1-hydroxycyclohexylphenyl ketone, and 2,2-dimethoxy-1,2-diphenylethane-1-on.

Thus, liquid crystal display devices No. 24 to No. 27 according to the present invention were obtained.

The voltage-transmittance characteristics and the response speed of each liquid crystal display device were evaluated in the same manner as in Example 1.

As a result, excellent display performance and high charge holding ratio and high reliability were obtained.

It is considered that these liquid crystal display devices No. 24 to No. 27 according to the present invention are especially suitable when driven by an active element such as a thin-film transistor.

EXAMPLE 28

The procedure for preparation of the liquid crystal display device No. 12 of the present invention in Example 12 was repeated except that benzoin propyl ether serving as the polymerization initiator for use in the polymerizable prepolymer composition B in Example 12 was replaced by 2-methyl-1-[4-(methylthio)phenyl]-2-morpholinopropanone.

Thus, a liquid crystal display device No. 28 according to the present invention was obtained.

The voltage-transmittance characteristics and the response speed of the liquid crystal display device No. 28 according to the present invention were evaluated in the same manner as in Example 1.

As a result, although excellent display performance was obtained, the charge holding ratio was as low as 70% and the charge holding ratio further decreased in the light-resistance test.

It is considered that the liquid crystal display device No. 28 of the present invention is excellent when driven by a passive element, but inferior to the liquid crystal display devices Nos. 24 to 27 when driven by an active element.

EXAMPLE 29

The procedure for preparation of the liquid crystal display device No. 14 of the present invention in Example 14 was repeated except that 1.5 parts by weight of trimethylolpropane triacrylate were added to 100 parts by weight of the prepolymer composition consisting of the monofunctional acrylate M3 and the bifunctional acrylate D3.

Thus, a liquid crystal display device No. 29 according to the present invention was obtained.

The voltage-transmittance characteristics and the response speed of the liquid crystal display device No. 29 according to the present invention were evaluated in the same manner as in Example 1.

As can be seen from the results in Table 8, the response speed and the hysteresis effect in the voltage-transmittance characteristics are drastically improved although the value of V90 is slightly increased.

TABLE 8

| Example No. | T (V) | V90 (V) | γ | H (%) | Response Speed (ms) |
|---|---|---|---|---|---|
| Ex. 14 | 9 | 8 | 2.0 | 5 | 50 |
| Ex. 29 | 9 | 9 | 2.0 | 2.5 | 30 |

When the liquid crystal/prepolymer composition according to the present invention is irradiated by the ultraviolet light to carry out the polymerization, the phase separation is induced and the droplets of the liquid crystal are dispersed in a polymer. The shape and the size of each droplet of the liquid crystal can easily be controlled and made remarkably uniform.

Therefore, the liquid crystal display device which is prepared using the aforementioned liquid crystal/prepolymer composition can be driven by the application of a low voltage thereto, and the response speed is high. In addition, the threshold values of the liquid crystal display device according to the present invention are clear, and the sharpness in the voltage-transmittance characteristics is excellent, so that the multiplex driving system is applicable.

Further, the hysteresis effect in the voltage-transmittance characteristics is remarkably small in the liquid crystal display device of the present invention, so that information can be displayed with gradation.

In addition, the reliability of the liquid crystal display device of the present invention can be improved by selecting the kind of polymerization initiator for use in the liquid crystal/prepolymer composition.

A conventional halogen-substituted liquid crystal has a high charge holding ratio, but the control of the structure of such a liquid crystal is considered to be difficult. When the conventional halogen-substituted liquid crystal is used for the liquid crystal/prepolymer composition of the present invention, excellent characteristics can be obtained and the high charge holding ratio can be maintained, so that such a liquid crystal display device can be driven by an active element.

Japanese Patent Application No. 05-298888 filed in Nov. 4, 1993 is hereby incorporated by reference.

What is claimed is:

1. A liquid crystal/prepolymer composition which comprises a liquid crystal component, a prepolymer composition and a photopolymerization initiator, said liquid crystal/prepolymer composition, when polymerized, being capable of inducing phase separation into said liquid crystal component and a polymer, said prepolymer composition consisting essentially of:

a monofunctional acrylate component having one double bond, with an HLB value of 3.2 to 5.5; and a bifunctional acrylate component having two double bonds, with an HLB value of 3.5 to 11, wherein said monofunctional acrylate component is present in an amount of from 20 to 80 wt. % of the total weight of said prepolymer composition.

2. The liquid crystal/prepolymer composition as claimed in claim 1, wherein said monofunctional acrylate component comprises a mixture of at least two monofunctional acrylates.

3. The liquid crystal/prepolymer composition as claimed in claim 1, wherein said bifunctional acrylate component comprises a mixture of at least two bifunctional acrylates.

4. The liquid crystal/prepolymer composition as claimed in claim 1, wherein said prepolymer composition further comprises a polyfunctional acrylate with at least three functional groups, and wherein said polyfunctional acrylate is present in an amount of 8 wt. % or less of the total weight of said prepolymer composition.

5. The liquid crystal/prepolymer composition as claimed in claim 1, wherein the amount of said photopolymerization initiator is in the range of 1 to 10 parts by weight to 100 parts by weight of the total amount of said prepolymer composition.

6. The liquid crystal/prepolymer composition as claimed in claim 1, wherein the amount of said liquid crystal component is in the range from 70 to 90 wt. % of the total weight of said liquid crystal/prepolymer composition.

7. A liquid crystal display device comprising a pair of support materials, and a liquid crystal/polymer composition held between said support materials, said liquid crystal/polymer composition comprising a liquid crystal component and a polymer composition, with phase separation into said liquid crystal component and said polymer composition, which is formed by polymerizing a liquid crystal/prepolymer composition which comprises a liquid crystal component, a prepolymer composition and a photopolymerization initiator, said liquid crystal/prepolymer composition, when polymerized, being capable of inducing said phase separation, said prepolymer composition consisting essentially of (a) monofunctional acrylate component having one double bond, with an HLB value of 3.2 to 5.5; and (b) a bifunctional acrylate component having two double bonds, with an HLB value of 3.5 to 11, wherein the amount of said monofunctional acrylate component is present in an amount of 20 to 80 wt. % of the total weight of said prepolymer composition.

8. The liquid crystal display device as claimed in claim 7, wherein said monofunctional acrylate component for use in said liquid crystal/prepolymer composition comprises a mixture of at least two monofunctional acrylates.

9. The liquid crystal display device as claimed in claim 7, wherein said bifunctional acrylate component for use in said liquid crystal/prepolymer composition comprises a mixture of at least two bifunctional acrylates.

10. The liquid crystal display device as claimed in claim 7, wherein said prepolymer composition further comprises a polyfunctional acrylate with at least three functional groups, and wherein said polyfunctional acrylate is present in an amount of 8 wt. % or less of the total weight of said prepolymer composition.

11. The liquid crystal display device as claimed in claim 7, wherein the amount of said photopolymerization initiator is in the range of 1 to 10 parts by weight to 100 parts by weight of the total amount of said prepolymer composition.

12. The liquid crystal display device as claimed in claim 7, wherein the amount of said liquid crystal component for use in said liquid crystal/prepolymer composition is in the range from 70 to 90 wt. % of the total weight of said liquid crystal/prepolymer composition.

13. The liquid crystal display device as claimed in claim 7, wherein said liquid crystal component for use in said liquid crystal/prepolymer composition is a nematic liquid crystal composition with a positive dielectric anisotropy.

14. The liquid crystal display device as claimed in claim 13, wherein said nematic liquid crystal composition comprises a liquid crystal with a positive dielectric anisotropy having a halogen as a polar-imparting group, and said polymerization initiator is selected from the group consisting of benzoin alkyl ether, 1-hydroxycyclohexylphenyl ketone and 2,2-dimethoxy-1,2-dimethoxy-1,2-diphenylethane-1-on.

15. The liquid crystal/prepolymer composition as claimed in claim 1, wherein said monofunctional acrylate component comprises a monofunctional acrylate of formula (1):

$$CH_2=CH-COO-(R^1-O-)_m-C_nH_{2n+1} \qquad (1)$$

wherein $R^1$ is an alkylene group having 2 or 3 carbon atoms, m is an integer of 0 to 6, and $C_nH_{2n+1}$ is a straight-chain or branched alkyl group with n being an inter providing said HLB value.

16. The liquid crystal/prepolymer composition as claimed in claim 1, wherein said monofunctional acrylate component comprises a monofunctional acrylate of formula (2):

$$CH_2=CH-COO-(-R^1-O-)_j-Ph-C_kH_{2k+1} \qquad (2)$$

wherein $R^1$ is an alkylene group having 2 or 3 carbon atoms; Ph is a phenylene group; j is an integer of 0 to 6; and $C_kH_{2k+1}$ is a straight-chain or branched alkyl group with k being an inter providing said HLB value.

17. The liquid crystal/prepolymer composition as claimed in claim 2, wherein one of said monofunctional acrylates is a monofunctional acrylate of formula (3):

$$CH_2=CH-COO-(R^1-O-)_p-C_qH_{2q-1} \qquad (3)$$

wherein $R^1$ is an alkylene group having 2 or 3 carbon atoms; p is an integer of 0 to 6; when p=0, q is an integer of 8 to 18; when p=1, q is an integer of 6 to 18; and when p is an integer of 2 to 6, q is an integer of 1 to 18.

18. The liquid crystal/prepolymer composition as claimed in claim 1, wherein one of said monofunctional acrylates is a monofunctional acrylate of formula (4):

$$CH_2=CH-COO-(CH_2CH_2O-)_u-Ph-C_vH_{2v+1}$$

wherein Ph is a phenylene group; u is an integer of 0 to 6; and v is an integer of 4 to 8.

19. The liquid crystal/prepolymer composition as claimed in claim 1, wherein said bifunctional acrylate component comprises a bifunctional acrylate of formula (5):

$$CH_2=CH-CO-R^2-CO-CH=CH_2 \qquad (5)$$

wherein $R^2$ is selected from the group consisting of:

(A) $-O(CH_2CH_2-O)_n-$ (n=2 to 5);

(B) $-O[CH(CH_3)CH_2-O]_n-$ (n=2 to 16);

(C) an alkyl group having 6 to 12 carbon atoms;

(D) $-O-R^3-COO-R_4-O-$ wherein $R_3$ is an alkylene group represented by $C_nH_{2n}$ and $R^4$ is an alkylene group represented by $C_mH_{2m}$ provided that n and m are integers of 2 or more and that the sum of m and n is in a range of 5 to 18; and (E) $-O-R^3-X-R^4-X-R^5(-X-R^6-)_i-(X-R^7)_j-O-$ wherein X is $-COO-$ or $-OCO-$; i and j are integers of 0 or 1; $R^3$ to $R^7$ each is an alkylene group having 2 or more carbon atoms or a cyclic alkyl group, provided that at least two of $R^3$, $R^4$, $R^5$, $R^6$ and $R^7$ are alkylene groups and the total number of carbon atoms of said alkylene groups and cyclic alkyl groups is 24 or less.

20. The liquid crystal display device as claimed in claim 7, wherein said monofunctional acrylate component comprises a monofunctional acrylate of formula (1):

$$CH_2=CH-COO-(R^1-O-)_m-C_nH_{2n+1} \qquad (1)$$

wherein $R^1$ is an alkylene group having 2 or 3 carbon atoms, m is an integer of 0 to 6, and $C_nH_{2n+1}$ is a straight-chain or branched alkyl group with n being an inter providing said HLB value.

21. The liquid crystal display device as claimed in claim 7, wherein said monofunctional acrylate component comprises a monofunctional acrylate of formula (2):

$$CH_2=CH-COO-(-R^1-O-)_j-Ph-C_kH_{2k+1} \qquad (2)$$

wherein $R^1$ is an alkylene group having 2 or 3 carbon atoms; Ph is a phenylene group; j is an integer of 0 to 6; and $C_kH_{2k+1}$ is a straight-chain or branched alkyl group with k being an inter providing said HLB value.

22. The liquid crystal display device as claimed in claim 8, wherein one of said monofunctional acrylates is a monofunctional acrylate of formula (3):

$$CH_2=CH-COO-(R^1-O-)_p-C_qH_{2q-1} \qquad (3)$$

wherein $R^1$ is an alkylene group having 2 or 3 carbon atoms; p is an integer of 0 to 6; when p=0, q is an integer of 8 to 18; when p=1, q is an integer of 6 to 18; and when p is an integer of 2 to 6, q is an integer of 1 to 18.

23. The liquid crystal display device as claimed in claim 8, wherein one of said monofunctional acrylates is a monofunctional acrylate of formula (4):

$$CH_2=CH-COO-(CH_2CH_2O-)_u-Ph-C_vH_{2v+1}$$

wherein Ph is a phenylene group; u is an integer of 0 to 6; and v is an integer of 4 to 8.

24. The liquid crystal display device as claimed in claim 7, wherein said bifunctional acrylate component comprises a bifunctional acrylate of formula (5):

$$CH_2=CH-CO-R^2-CO-CH=CH_2 \qquad (5)$$

wherein $R^2$ is selected from the group consisting of:

(A) $-O(CH_2CH_2-O)_n-$ (n=2 to 5);

(B) $-O[CH(CH_3)CH_2-O]_n-$ (n=2 to 16);

(C) an alkyl group having 6 to 12 carbon atoms;

(D) $-O-R^3-COO-R^4-O-$ wherein $R^3$ is an alkylene group represented by $C_nH_{2n}$ and $R^4$ is an alkylene group represented by $C_mH_{2m}$ provided that n and m are integers of 2 or more and that the sum of m and n is in a range of 5 to 18; and (E) —O—$R^3$—X—$R^4$—X—$R^5$(—X—$R^6$—)$_i$—(X—$R^7$)$_j$—O— wherein X is —COO— or —OCO; i and j are integers of 0 or 1; $R^3$ to $R^7$ each is an alkylene group having 2 or more carbon atoms or a cyclic alkyl group, provided that at least two of $R^3$, $R^4$, $R^5$, $R^6$ and $R^7$ are alkylene groups and the total number of carbon atoms of said alkylene groups and cyclic alkyl groups is 24 or less.

25. The liquid crystal/prepolymer composition as claimed in claim 1, wherein said liquid crystal/prepolymer composition consists essentially of said liquid crystal component, said prepolymer composition and said photopolymerization initiator.

26. The liquid crystal/prepolymer composition as claimed in claim 1, wherein said liquid crystal/prepolymer composition consists of said liquid crystal component, said prepolymer composition and said photopolymerization initiator.

27. The liquid crystal display device as claimed in claim 7, wherein said liquid crystal/polymer composition is formed by polymerizing a liquid crystal/prepolymer composition which consists essentially of said liquid crystal component, said prepolymer composition and said photopolymerization initiator.

28. The liquid crystal display device as claimed in claim 7, wherein said liquid crystal/polymer composition is formed by polymerizing a liquid crystal/prepolymer composition which consists of said liquid crystal component, said prepolymer composition and said photopolymerization initiator.

* * * * *

UNITED STATES PATENT AND TRADEMARK OFFICE
CERTIFICATE OF CORRECTION

PATENT NO. : 5,496,497

DATED : March 5, 1996

INVENTOR(S) : Yasuyuki TAKIGUCHI, et, al.

It is certified that error appears in the above-identified patent and that said Letters Patent is hereby corrected as shown below:

Title page, item [54] and col. 1, lines 1 to 3, "LIQUID CRYSTAL PREPOLYMER COMPOSITION AND LIQUID CRYSTAL DISPLAY DEVICE USING THE SAME" should read --LIQUID CRYSTAL/PREPOLYMER COMPOSITION AND LIQUID CRYSTAL DISPLAY DEVICE USING THE SAME--.

Column 5, Table 2, line 34, "5    6.9" should read --5    6.8--.

Column 15, Table 3, "M3   $CH_2-CH-COO-(CH_2CH_2O)_3-(CH_2)_{11}CH_3$" should read --M3   $CH_2=CH-COO-(CH_2CH_2O)_3-(CH_2)_{11}CH_3$--.

Table 3, "M4

" should read --M4

--.

UNITED STATES PATENT AND TRADEMARK OFFICE
CERTIFICATE OF CORRECTION

PATENT NO. : 5,496,497
DATED : March 5, 1996
INVENTOR(S) : Yasuyuki TAKIGUCHI, et al.

It is certified that error appears in the above-identified patent and that said Letters Patent is hereby corrected as shown below:

```
Column 19, Table 6, line 9,  "Ex. 16   D3   M5   9" should
      read --Ex. 16   D3   M5   8--.
          Table 6, line 15, "(*)DA:  biffunctional acrylate"
      should read --(*)DA:  bifunctional acrylate--.

Column 23, line 31, "inter" should read --integer--.
          line 42, "inter" should read --integer--.

Column 24, line 24, "inter" should read --integer--.
          line 34, "inter" should read --integer--.
```

Signed and Sealed this

Tenth Day of February, 1998

BRUCE LEHMAN

*Attest:*

*Attesting Officer*     *Commissioner of Patents and Trademarks*